Jan. 20, 1925.

N. E. STAMM

COW YOKE

Original Filed March 25, 1921

1,523,792

INVENTOR
BY Newton E. Stamm
ATTORNEY

Patented Jan. 20, 1925.

1,523,792

UNITED STATES PATENT OFFICE.

NEWTON E. STAMM, OF PUEBLO, COLORADO.

COW YOKE.

Application filed March 25, 1921. Serial No. 455,631. Renewed June 20, 1924.

*To all whom it may concern:*

Be it known that I, NEWTON E. STAMM, a citizen of the United States, residing at Pueblo, in the county of Pueblo and State of Colorado, have invented certain new and useful Improvements in Cow Yokes, of which the following is a specification.

The present invention relates to yokes for cattle, and the principal object is to prevent the live-stock from breaking through the fences.

The invention consists in the construction, combination and arrangement of parts, as will be hereinafter fully described, illustrated in the accompanying drawings, and pointed out in the claim hereunto appended.

Referring to the drawings, like numerals designate like parts in the various drawings.

Figure 3:
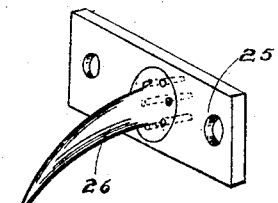
Fig. 3 is a detail perspective view of the spur element.
Figures 1, 2:
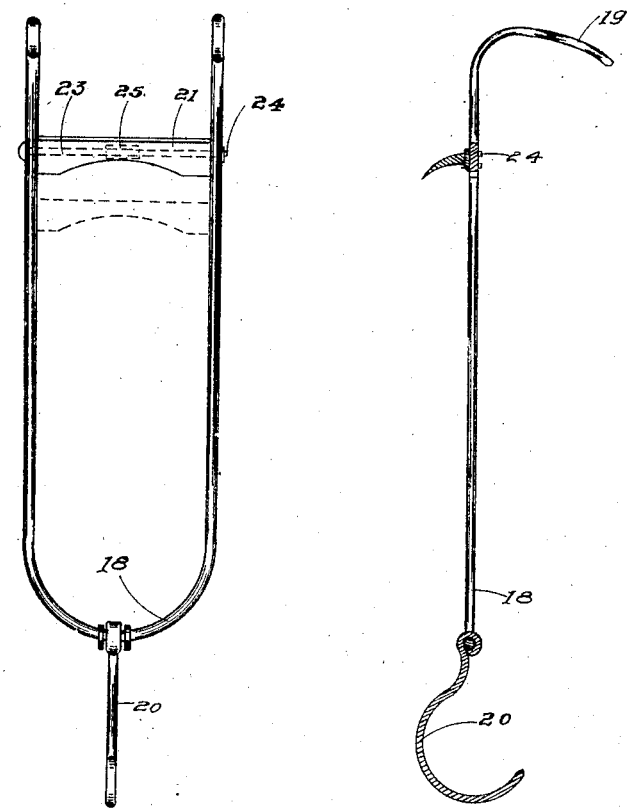
Fig. 1 is a front elevation of my yoke.
Fig. 2 is an elevation of the same.

In Figs. 1 and 2, the yoke 18 has bent over ends 19 and a hook 20 pivotally attached thereto. Between the side members of the yoke I place a wooden bar 21, having a longitudinal opening formed therethrough. A rod 23 extends through openings in the yoke extensions and the bar 21, and carries retaining nuts 24. This bar 21 is adjustable between the side bars of the yoke and is adapted to engage the upper part of the neck of the animal, to prevent the head from slipping through the yoke.

A plate 25 is screwed to the rear face of bar 21, and has secured thereon a downwardly directed spur member 26. Should the animal try to pass its head through the fence wires, the yoke will be moved to cause the spur 26 to penetrate the neck. The greater the effort the animal makes to get through the fence, the deeper the spur will penetrate the hide.

From the foregoing, it is thought that the construction of my invention will be clearly understood, and, therefore, a more extended explanation has been omitted.

Having thus described the invention, what I claim as new, is:

As an improved article of manufacture, the herein described animal yoke, comprising a bar bent centrally to form a bowed portion with upwardly directed extensions with their upper ends bent forwardly and downwardly therefrom, said extensions being formed with spaced openings, rings on the bowed portion, a hook pivotally mounted on the bowed portion between said rings, and a bar disposed between said extensions, a rod extended through openings in said extensions and said bar and adjustable vertically, and a plate carried by said bar and carrying a spur.

In testimony whereof I affix my signature in the presence of two witnesses.

NEWTON E. STAMM.

Witnesses:
 JOHN H. LOVE,
 JOHN P. HURLEY.